United States Patent
Brown

[11] Patent Number: 5,628,215
[45] Date of Patent: May 13, 1997

[54] FRONT SEAT LOCKING DEVICE

[76] Inventor: Hugh Brown, 137-11 155th St., Jamaica, N.Y. 11434

[21] Appl. No.: 556,717

[22] Filed: Nov. 13, 1995

[51] Int. Cl.⁶ .................................................. A47C 31/00
[52] U.S. Cl. ...................... 70/261; 70/237; 297/378.14
[58] Field of Search ........................... 70/209, 237, 238, 70/261; 297/378.12, 378.14; 180/287

[56] References Cited

U.S. PATENT DOCUMENTS

| | | | |
|---|---|---|---|
| 27,469 | 3/1860 | Palmer | 70/261 |
| 429,176 | 6/1890 | Parham | 70/261 |
| 2,479,361 | 8/1949 | Hower | 70/261 |
| 3,028,198 | 4/1962 | Murr | 297/378.14 |
| 4,116,297 | 9/1978 | Ross et al. | 180/287 |
| 5,213,388 | 5/1993 | Baker | 180/287 X |
| 5,251,465 | 10/1993 | Hwang | 70/226 X |
| 5,412,964 | 5/1995 | Yee | 70/237 X |
| 5,454,613 | 10/1995 | Weber et al. | 70/261 X |

FOREIGN PATENT DOCUMENTS

| | | | |
|---|---|---|---|
| 2618741 | 2/1989 | France | 70/237 |
| 3042033 | 6/1982 | Germany | 70/237 |
| 0428246 | 5/1935 | United Kingdom | 297/378.12 |
| 2153764 | 8/1985 | United Kingdom | 70/237 |
| 2191981 | 12/1987 | United Kingdom | 70/237 |
| 2248593 | 4/1992 | United Kingdom | 70/209 |

Primary Examiner—Lloyd A. Gall
Attorney, Agent, or Firm—Bauer & Schaffer

[57] ABSTRACT

The driver's seat is provided with a tiltable seat back, along the edge facing the door is mounted an elongated bar. The bar is pivoted at its lower end to the chassis as to be conjointly tiltable with the seat back. Fixedly mounted about midway of the side edge of the seat back is a hasp through which the bar passes. The hasp and the bar are provided with cooperating locking devices so that the assembly can be fixed in a selected tilted position.

4 Claims, 1 Drawing Sheet

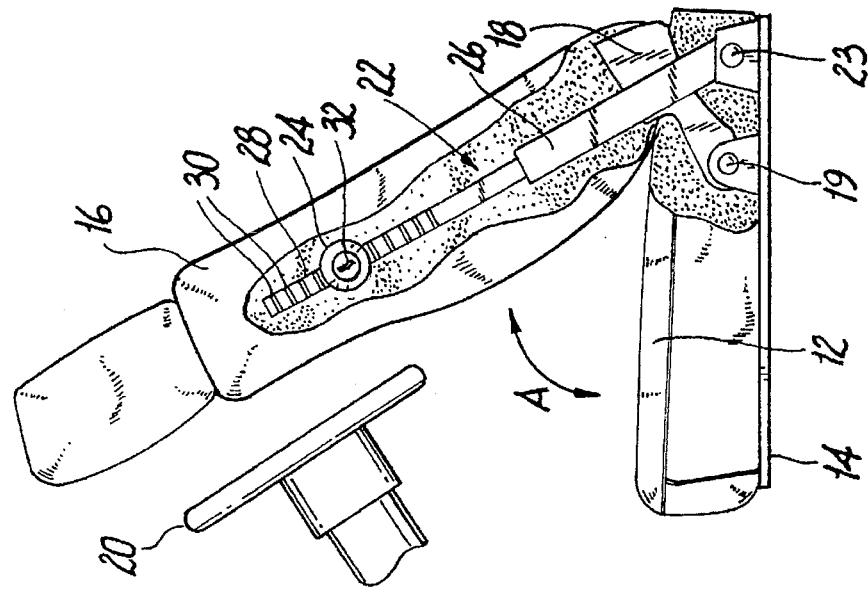
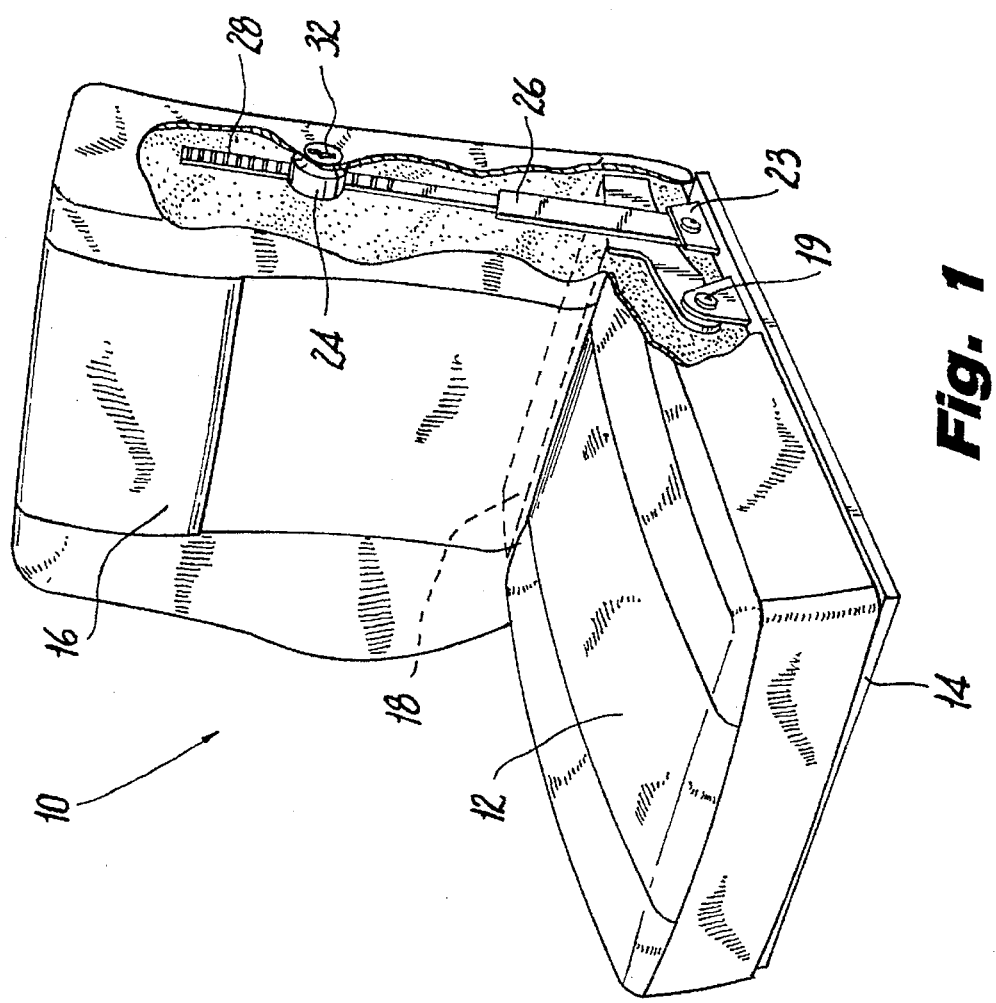

FRONT SEAT LOCKING DEVICE

BACKGROUND OF THE INVENTION

The present invention relates generally to a locking device for a front seat of a vehicle and more specifically to an anti-theft device for a vehicle designed to lock the driver's side front seat of the vehicle in a forward tilted position firmly against the steering wheel for preventing unauthorized use of the seat and manipulation of a steering wheel.

Anti-theft devices for cars are known. Also known are anti-theft devices which lock a vehicle seat in different forward positions preventing unauthorized use of a driver's side seat and/or manipulation of a steering wheel. Most of these devices are time consuming to use and have difficult and inconvenient operating modes.

U.S. Pat. No. 4,116,297 to Ross for a Vehicle Seat Lock and U.S. Pat. No. 5,213,388 to Baker for a Anti-theft Vehicle Seat Apparatus each require the user to remove and replace a pad lock to operate the invention. The pad lock is difficult to access due to its location behind the driver's side seat near the floor. This is both time consuming and inconvenient. U.S. Pat. No. 5,251,465 to Hwang for an Anti-theft Device for Automobiles requires the user to open and hook up steering wheel locking clamps. These clamps require the user to reach through difficult locations. This is also time consuming and inconvenient.

What all of the present vehicle anti-theft front seat locking devices lack, and what is desirable to have, is the ability to quickly and easily engage and disengage a front seat locking device. This long standing but heretofore unfulfilled need for a quick and easily usable front seat locking device is now fulfilled by the invention disclosed hereinafter.

SUMMARY OF THE INVENTION

According to the present invention a front seat locking device for preventing unauthorized use of a driver's side seat as well as the manipulation of the steering wheel is comprised of a pivoted bar mounted below the surface of and within the edge of the seat back to extend upwardly along the length of the seat facing the car door. The pivot bar is journaled at its lower end to the vehicle chassis or the seat base and is provided with a series of ratchet teeth along its length. A hasp mechanism through which the pivoted bar extends is fixed to the frame of the seat back. When the seat back is tilted, the hasp mechanism moves over the ratchet teeth. The hasp mechanism is provided with a key lock capable of securing the bar to the hasp mechanism thereby fixing the back of the seat in a tilted position.

When the seat is tilted forward and the pivoted bar is locked into the hasp mechanism both the seat back and the steering wheel are unaccessible to an unauthorized user. This anti-theft device, unlike the others which preceded it, has a locking and unlocking mechanism that is easily accessible to the driver and conveniently located along the exposed edge of the seat, thus making its use quick and easy.

Full details of the present invention are set forth in the following description and in the accompanying drawings.

BRIEF DESCRIPTION OF THE DRAWINGS

For a more complete understanding of the nature and objects of the invention, reference should be made to the following detailed description, taken in connection with the accompanying drawings, in which:

FIG. 1 is a perspective view partially sectioned of a driver's side front seat of a vehicle showing the invention attached to the outer side of the seat, and FIG. 2 is a side elevational view similar to FIG. 1 showing the seat in locked position against the steering wheel.

Similar reference numerals refer to similar parts throughout the several views of the drawings.

DETAILED DESCRIPTION OF THE PREFERRED EMBODIMENT

In the drawing only so much of a vehicle such as a conventional automobile or light truck is shown as is required for an understanding of the invention. Such a vehicle is provided with a tiltable driver's seat assembly generally depicted by the numeral 10, having a seat 12 mounted on a base 14 secured to the vehicle chassis. The seat 12 may at times, if desired, be secured directly to the chassis. Pivotally mounted on to the base 14 is a seat back 16, comprising a cushion exterior built upon a metal frame. The seat back 16 is secured at its lower end in a rigid brace-like saddle 18 mounted on pivot shaft 19 to the base 14 which permits the seat back to be repeatedly, tilted or folded forwardly in the direction of arrow A against the steering wheel 20, as seen in FIG. 2.

According to the present invention an elongated bar 22 is freely set within and below the surface of the vertical side edge of the seat back 16 to extend upwardly from the base 14. The lower end of the bar 22 is pivotally connected to the base 14 as at numeral 23 so as to conjointly tilt as the seat back 16 tilts. The bar 22 extends upwardly along the accessible side of the seat back 16 and passes through a hasp mechanism 24 fixed securely to the frame of the seat back 16. The lower portion 26 of the pivoted bar 22 is somewhat thicker than the upper portion 28 to add greater strength and rigidity, while the upper portion 28 is provided with a series of ratchet teeth 30 which engage and latch with a pawl (not shown) located within the hasp mechanism 24 as the seat and the bar 22 move. The hasp mechanism has a key lock 32 capable of securing the pawl fixed and thus securing the hasp mechanism and the pivoted bar securely together so as to fix the seat back 16 in any selected tilted position.

In lieu of ratchet teeth 30, the pivoted bar 22 can be formed with a series of holes and the hasp can be provided with a bolt for filling the holes. Other cooperating latching means can be provided to provide incremented engagement of the bar and hasp. The length of the bar 22 is not critical, being only so long as to be able to make engagement with the hasp mechanism when the seat back is upright. The hasp mechanism is preferably placed midway along the height of the seat back for greatest angular strength when the seat back is locked in its forward tilt. The exact position of the hasp mechanism is also not critical. If desired, the hasp is secured to the frame of the seat so as to have a small amount of play relative to the frame. Such play will enable the hasp and the bar to move lengthwise relative to each other, without harm to the manner by which the hasp itself is secured to the seat back frame. Alternatively, the bar may be loosely pivoted at its lower end to provide such play.

The seat back 16 when being locked in the forward tilted position up against the steering wheel as seen in FIG. 2 will prevent any unauthorized use of the seat as well as any unauthorized manipulation of the steering wheel, thus deterring theft of the vehicle. A significant advantage also arises in that the driver's seat can not even be occupied. This prevents an erstwhile intruder from tampering with the vehicle wires, starter mechanism or the like.

To replace the seat back 16 to its operating position the user simply unlocks the hasp mechanism 24 through the use of a provided key. The key lock 32 is easily accessible on the outside edge of the seat back 16. The user returns the seat back 16 to its upright position and is ready to operate the vehicle.

It shall be noted that all of the above description and accompanying drawings of the invention are to be considered illustrative and are not to be considered in the limiting sense. It is also understood that the following claims are intended to cover all of the generic and specific embodiments and features of the invention herein described.

What is claimed is:

1. Apparatus for preventing the unauthorized use of a vehicle having a chassis, said apparatus comprising at least a front seat provided with a tiltable seat back, said apparatus further comprising:

an elongated bar having a lower end and an upper end located along a side edge of the tiltable seat back;

means for pivotally fixing said bar at said lower end to the vehicle chassis such that said bar will freely swing conjointly with said seat back;

a hasp mechanism secured fixedly to the side edge of the seat back through which said upper end of said bar passes;

said bar and said hasp mechanism having cooperating engaging means to incrementally latch said hasp mechanism and said pivoted bar as said seat back is moved;

said hasp mechanism having a key lock for securing said bar in a selected fixed position, as said seat back is titled.

2. The apparatus according to claim 1, wherein said cooperating engaging means comprises a series of ratchet teeth on said elongated bar for receiving a pawl within said hasp mechanism.

3. The apparatus according to claim 1, wherein said elongated bar extends below a surface of the side edge of said seat back.

4. A front seat locking device, comprising:

a pivoted bar having a lower end and an upper end;

means for connecting said pivoted bar at said lower end to a seat portion of a forwardly tilting vehicle seat such that said pivoted bar will freely swing forward and back;

said pivoted bar extending upwardly from said connecting means;

said pivoted bar having a series of ratchet teeth at said upper end;

a hasp mechanism through which said upper end of said pivoted bar is extended;

means for securing said hasp mechanism to a frame of a side of a seat back;

said hasp mechanism having means to incrementally latch onto said ratchet teeth of said pivoted bar as said seat back is tilted forwardly;

said hasp mechanism having a key lock;

said hasp mechanism in combination with said key lock securing said pivoted bar in a fixed position.

* * * * *